United States Patent
Toyama et al.

(10) Patent No.: US 9,557,517 B2
(45) Date of Patent: Jan. 31, 2017

(54) LENS BARREL

(71) Applicant: OLYMPUS CORPORATION, Hachioji-shi, Tokyo (JP)

(72) Inventors: Mitsuru Toyama, Hachioji (JP); Kazuyuki Iwasa, Hachioji (JP)

(73) Assignee: Olympus Corporation, Tokyo (JP)

( * ) Notice: Subject to any disclaimer, the term of this patent is extended or adjusted under 35 U.S.C. 154(b) by 30 days.

(21) Appl. No.: 13/910,700

(22) Filed: Jun. 5, 2013

(65) Prior Publication Data

US 2013/0329310 A1    Dec. 12, 2013

(30) Foreign Application Priority Data

Jun. 6, 2012  (JP) ................................. 2012-129183

(51) Int. Cl.
| | | |
|---|---|---|
| *G02B 7/04* | (2006.01) | |
| *G02B 7/08* | (2006.01) | |
| *G03B 3/10* | (2006.01) | |

(52) U.S. Cl.
CPC . *G02B 7/04* (2013.01); *G02B 7/08* (2013.01); *G03B 3/10* (2013.01); *G03B 2205/0053* (2013.01)

(58) Field of Classification Search
CPC ............. G02B 7/08; G02B 7/102; G02B 7/04; H04N 5/23212; H04N 5/2254; H04N 5/623209; G03B 13/36; G03B 3/10; G03B 2205/0053
See application file for complete search history.

(56) References Cited

U.S. PATENT DOCUMENTS

| | | | | |
|---|---|---|---|---|
| 5,675,442 | A  * | 10/1997 | Parks | 359/701 |
| 7,064,911 | B2 * | 6/2006 | Soppelsa | 359/823 |
| 7,573,652 | B2 * | 8/2009 | Tsai | 359/696 |
| 2008/0291543 | A1 * | 11/2008 | Nomura et al. | 359/676 |
| 2012/0262595 | A1 * | 10/2012 | Kishida et al. | 348/220.1 |

FOREIGN PATENT DOCUMENTS

| | | | | |
|---|---|---|---|---|
| CN | 101257576 | A | 9/2008 | |
| CN | 101354468 | A | 1/2009 | |
| JP | 08-075974 | A | 3/1996 | |
| JP | 11-311734 | A | 11/1999 | |
| JP | 2005-234075 | | 9/2005 | |
| JP | 2005234075 | * | 9/2005 | ............... G02B 7/04 |
| WO | 2011-024473 | A1 | 3/2011 | |
| WO | WO2011048752 | * | 4/2011 | ............... G02B 7/08 |
| WO | WO2011024473 | * | 5/2011 | ......... H04N 5/23212 |

OTHER PUBLICATIONS

Office Action mailed in corresponding Chinese Patent Application No. 201310222438X on Mar. 26, 2015, consisting of 8 pp.
Office Action mailed in corresponding Japanese Patent Application No. 2012-129183 on Jan. 26, 2016, consisting of 4 pp.

* cited by examiner

*Primary Examiner* — Zachary Wilkes
*Assistant Examiner* — George G King
(74) *Attorney, Agent, or Firm* — Volpe and Koenig, P.C.

(57) ABSTRACT

The present invention provides a lens barrel that holds a lens system including a plurality of lens groups in which an object-side fixed lens group and image-side fixed lens group that are fixed to both ends of a cylindrical fixed barrel are arranged, and a first focusing lens group and a second focusing lens group that are moving lens groups are arranged inside the fixed barrel.

4 Claims, 12 Drawing Sheets

O ←——→ I

O ←——→ I

LENS BARREL

CROSS REFERENCE TO RELATED APPLICATION

This application claims the benefit of Japanese Application No. 2012-129183 filed in Japan on Jun. 6, 2012, the contents of which are incorporated herein by this reference.

BACKGROUND OF THE INVENTION

1. Field of the Invention

The present invention relates to a lens barrel that holds a lens system that includes a plurality of lens groups.

2. Description of the Related Art

In a lens barrel that holds a lens system that includes a plurality of lens groups that is used, for example, in a camera or a video camera, a configuration is generally adopted in which some lens groups are held so as to be movable along an optical axis by an electric actuator. For example, in Japanese Patent Application Laid-Open Publication No. 2005-234075, a lens barrel is disclosed that, among four lens groups, movably holds a second group and a fourth group of lenses. According to the technology disclosed in Japanese Patent Application Laid-Open Publication No. 2005-234075, a focusing operation is performed by moving the fourth lens group that includes a plurality of lenses.

SUMMARY OF THE INVENTION

A lens barrel according to one aspect of the present invention is a lens barrel that holds a lens system including a plurality of lens groups, the lens barrel including: a cylindrical fixed barrel; an object-side fixed lens group that is a lens group that is positioned furthest on an object side of the lens system, and that is fixed to an object-side end portion of the fixed barrel; an image-side fixed lens group that is a lens group that is positioned furthest on an image side of the lens system, and that is fixed to an image-side end portion of the fixed barrel; a first focusing lens group that is a lens group that is arranged at a position that is further on the image side than the object-side fixed lens group of the lens system; a first moving lens holding barrel that holds the first focusing lens group and that is arranged so as to be movable along the optical axis inside the fixed barrel; a second focusing lens group that is a lens group that is arranged at a position that is further on the image side than the first focusing lens group of the lens system; a second moving lens holding barrel that holds the second focusing lens group and that is arranged so as to be movable along the optical axis inside the fixed barrel; and a plurality of drive mechanism portions that independently drive the first moving lens holding barrel and the second moving lens holding barrel, respectively; in which the lens barrel is configured to be capable of performing a focusing operation by moving the first focusing lens group and the second focusing lens group in an optical axis direction.

DETAILED DESCRIPTION OF THE PREFERRED EMBODIMENTS

A preferred embodiment of the present invention is described hereunder with reference to the accompanying drawings. Note that the components in the accompanying drawings referred to in the following description are each displayed in a different contraction scale so as to be shown in a size that is recognizable in the accompanying drawings. Further, the present invention is not limited only to the quantity of components, the shapes of components, the ratios between the sizes of components, and the relative positional relationship between the respective components described in the accompanying drawings.

Figure 1:
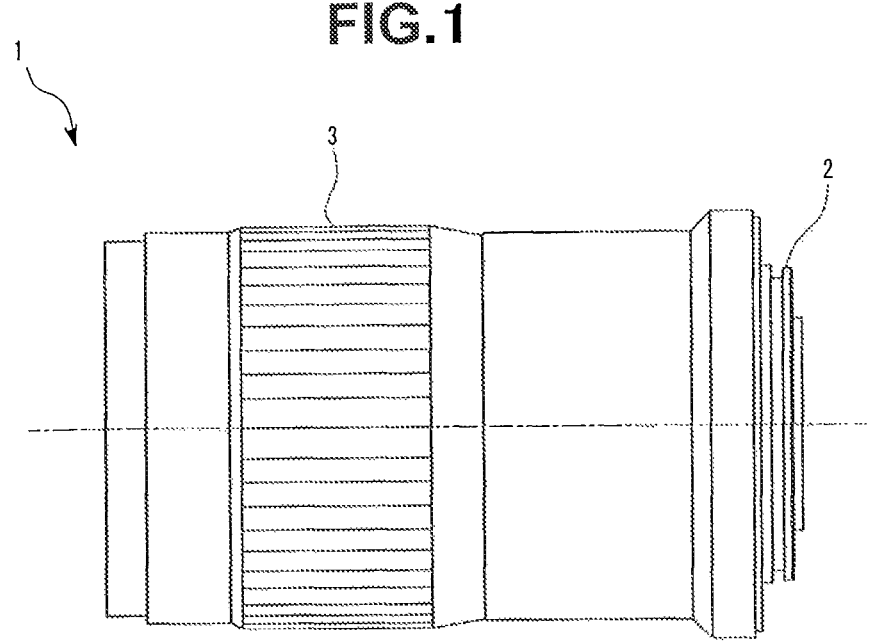
FIG. 1 is an external view of a lens barrel.

A lens barrel 1 of the present embodiment is configured so as to hold a lens system that includes a plurality of lenses that is described later. As shown in FIG. 1, the lens barrel 1 has a cylindrical external appearance in which an optical axis of the lens system is approximately the central axis thereof.

As one example, the lens barrel 1 has the form of a so-called "interchangeable lens" in a camera system that is capable of interchanging lenses, and is configured to be detachably attached to an unshown camera body. Specifically, as shown in FIG. 1, the lens barrel 1 includes a mount portion 2 that is configured to be capable of engaging with the camera body by means of a bayonet mechanism or a screw mechanism or the like that is provided at a proximal end portion thereof. Note that the lens barrel 1 may also be of a form that cannot be separated from the camera body, and the lens barrel 1 may also be of a form that includes an image pickup device that is arranged on an image side of the lens system.

The lens barrel 1 of the present embodiment has a form that supports auto focusing. As described later in detail, the lens barrel 1 includes drive mechanism portions that move some lenses of the lens system forward and rearward along the optical axis, and is configured so that a focusing distance can be changed accompanying the aforementioned movement of some lenses.

An annular focus ring 3 that is arranged so as to be rotatable in the circumferential direction is provided at an outer circumferential portion of the lens barrel 1. Although not shown in the accompanying drawings, the lens barrel 1 includes an encoder that detects a rotational direction and a rotational speed of the focus ring 3, and is also capable of a manual focus operation that changes a focusing distance in accordance with a detection result regarding the rotational direction and rotational speed of the focus ring 3. Note that the lens barrel 1 may also be of a form that does not include the focus ring 3. For example, the lens barrel 1 may be a form that performs a manual focus operation in accordance with an input operation of a user via an interface of another form such as a lever switch, a dial switch, or a touch sensor that is provided on the lens barrel 1 or the camera body.

Figure 2:
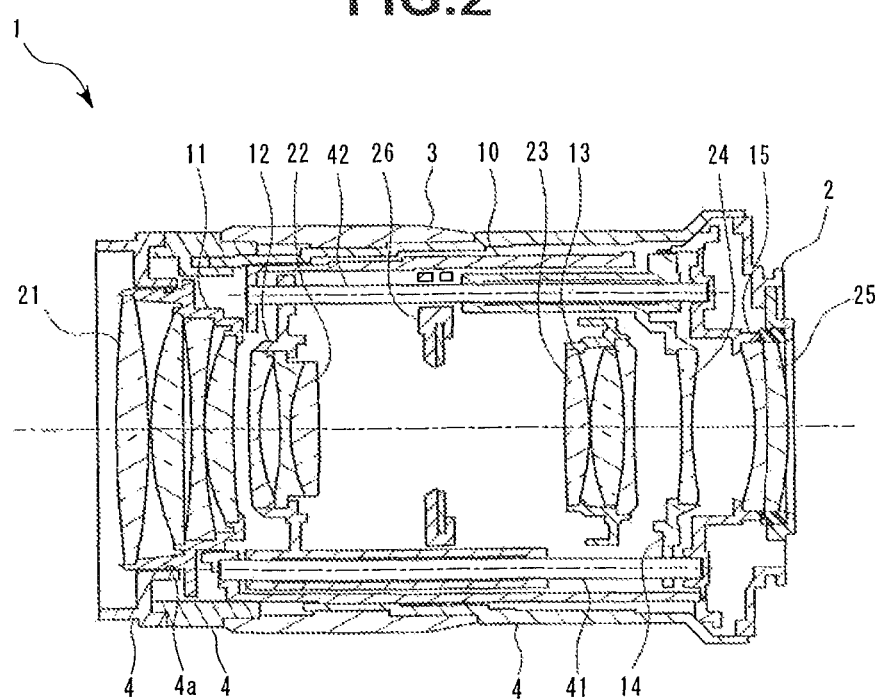
FIG. 2 is a cross-sectional view of the lens barrel in a state in which a focusing distance is set to infinity.
Figure 3:
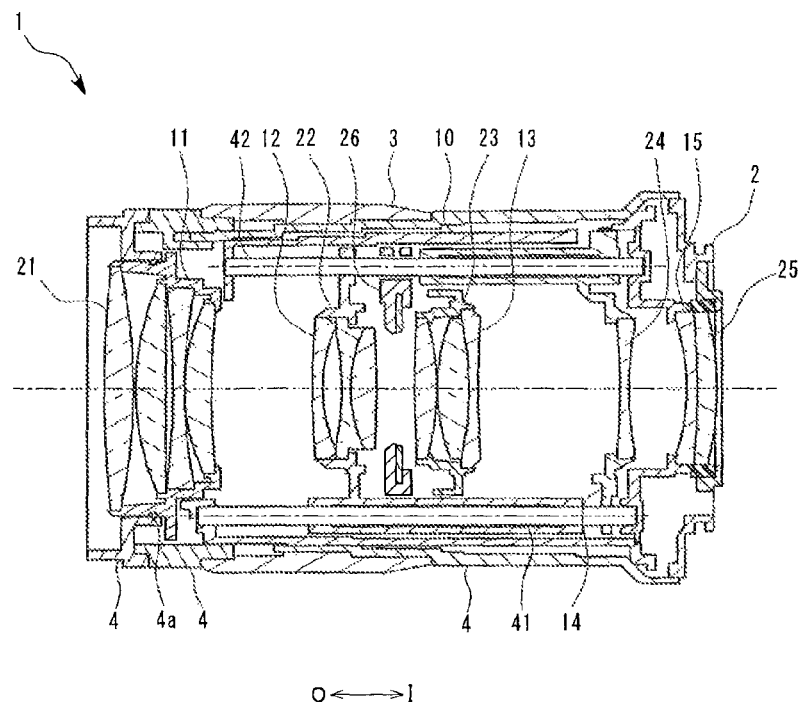
FIG. 3 is a cross-sectional view of the lens barrel in a state in which a focusing distance is set to the minimum distance.

First, the lens system that the lens barrel 1 of the present embodiment holds will be described. FIG. 2 is a cross-sectional view of the lens barrel 1 in a state in which a focusing distance is set to infinity (when focusing to infinity; time of minimum magnification). FIG. 3 is a cross-sectional view of the lens barrel 1 in a state in which the focusing distance is set to the minimum (when focusing to the minimum distance; time of maximum magnification). In FIG. 2 and FIG. 3, the left side of the drawings as viewed from the front is an object side and the right direction is an image side. In FIG. 2 and FIG. 3, an arrow O indicates the object side and an arrow I indicates the image side.

The lens system includes five lens groups, namely, in order from the object side to the image side, a first lens group 21, a second lens group 22, a third lens group 23, a fourth lens group 24, and a fifth lens group 25. A diaphragm mechanism portion 26 is arranged between the second lens group 22 and the third lens group 23.

The first lens group 21 is an object-side fixed lens group, and has a positive refractive power. The first lens group 21 has a configuration in which a biconvex positive lens, a positive meniscus lens whose convex surface faces the object side, a biconcave negative lens, and a plano-convex positive lens whose convex surface faces the object side are arranged in that order from the object side to the image side.

The second lens group 22 is a first focusing lens group, and has a negative refractive power. The second lens group 22 has a configuration in which a negative meniscus lens whose convex surface faces the object side, and a cemented lens that is made up of a biconcave negative lens and a plano-convex positive lens whose convex surface faces the object side are arranged in that order from the object side to the image side.

The third lens group 23 is a second focusing lens group, and has a positive refractive power. The third lens group 23 has a configuration in which a biconvex positive lens and a cemented lens that is made up of a biconvex positive lens and a biconcave negative lens are arranged in that order from the object side to the image side.

The fourth lens group 24 is a wobbling lens group, and has a negative refractive power. The fourth lens group 24 is constituted by a single biconcave negative lens. The fifth lens group 25 is an image-side lens group, and has a negative refractive power. The fifth lens group 25 is an image-side fixed lens group, and is constituted by a cemented lens that is made up of a biconcave negative lens and a biconvex positive lens.

The lens system is of an inner-focus type in which the position of the first lens group 21 that is arranged furthest on the object side is fixed, and is configured so as to change a focusing distance by moving the second lens group 22 and the third lens group 23 in the optical axis direction as a focusing operation. The second lens group 22 and the third lens group 23 are capable of moving independently in the optical axis direction.

In a focusing operation of the lens system, when the optical system changes the focusing distance from infinity to the minimum focusing distance, the second lens group 22 moves to the image side while widening the interval between the first lens group 21 and the second lens group 22 and narrowing the interval between the diaphragm mechanism portion 26 and the second lens group 22. Further, when the optical system changes the focusing distance from infinity to the minimum focusing distance, the third lens group 23 moves to the object side while narrowing the interval between the diaphragm mechanism portion 26 and the third lens group 23 and widening the interval between the fourth lens group 24 and the third lens group 23. Note that the configuration that causes the second lens group 22 and the third lens group 23 to move in the optical axis direction in the lens barrel 1 is described later.

The lens system is configured so that the fourth lens group 24 vibrates at a very small amplitude in the optical axis direction as a wobbling operation. In the wobbling operation of the lens system, the fourth lens group 24 vibrates in the optical axis direction at a predetermined amplitude. Based on information regarding the movement of the fourth lens group 24 and information regarding a change in an image formation state on an image formation surface caused by movement of the fourth lens group 24, the camera body that has the lens barrel 1 is capable of calculating a movement direction and a movement amount of the second lens group 22 and the third lens group 23 in a so-called "hill-climbing type" contrast detection autofocus operation. Note that a configuration that causes the fourth lens group 24 to move in the optical axis direction in the lens barrel 1 is described later.

In the lens system, the position of the fifth lens group 25 that is arranged at a position that is furthest on the image side is fixed. The position of the diaphragm mechanism portion 26 is also fixed.

As described above, in the lens system that the lens barrel 1 of the present embodiment holds, the fourth lens group 24 constituted by a single lightweight lens that has a small diameter is provided as a lens for a wobbling operation, and the second lens group 22 and the third lens group 23 in a floating state that independently move are configured as a first and a second focusing lens group. According to this configuration, at the time of a focusing operation by the lens barrel 1, since a wobbling operation is performed by the lightweight fourth lens group 24 first, the wobbling operation can be performed quickly and quietly. As a result, based on the wobbling operation, a focusing operation can be completed quickly by driving the second lens group 22 and the third lens group 23 that include a plurality of lenses and are comparatively heavy in an accurate direction that matches the focus.

Next, the configuration of the lens barrel 1 that holds the above described lens system is described.

As shown in FIG. 2 and FIG. 3, the lens barrel 1 includes a first fixed lens holding barrel 11, a first moving lens holding barrel 12, a second moving lens holding barrel 13, a third moving lens holding barrel 14, and a second fixed lens holding barrel 15 that hold the first lens group 21, the second lens group 22, the third lens group 23, the fourth lens group 24, and the fifth lens group 25, respectively. The lens barrel 1 also includes the mount portion 2, a fixed barrel 10, and an exterior member 4.

The fixed barrel 10 is a substantially cylindrical barrel member that is configured so as to support the first fixed lens holding barrel 11, the first moving lens holding barrel 12, the second moving lens holding barrel 13, the third moving lens holding barrel 14, the second fixed lens holding barrel 15, and the diaphragm mechanism portion 26. As described in detail later, the first fixed lens holding barrel 11, the second fixed lens holding barrel 15, and the diaphragm mechanism portion 26 are fixed at predetermined positions with respect to the fixed barrel 10. The first moving lens holding barrel 12, the second moving lens holding barrel 13, and the third moving lens holding barrel 14 are supported so as to be movable in the optical axis direction inside the fixed barrel 10.

Figure 4:
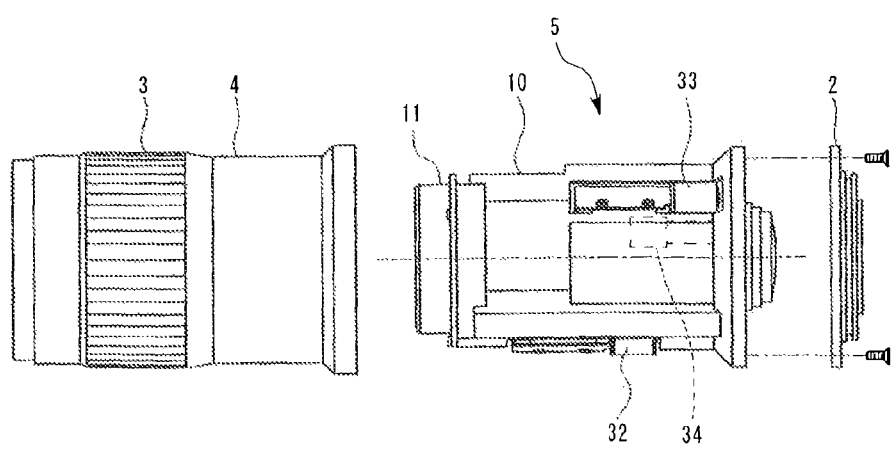
FIG. 4 is an exposed view of the lens barrel.

As shown in FIG. 4, the fixed barrel 10 is configured to also support a first drive mechanism portion 32 for driving the first moving lens holding barrel 12, a second drive mechanism portion 33 for driving the second moving lens holding barrel 13, and a third drive mechanism portion 34 for driving the third moving lens holding barrel 14.

Thus, the lens barrel 1 of the present embodiment is configured so that the first fixed lens holding barrel 11, the first moving lens holding barrel 12, the second moving lens holding barrel 13, the third moving lens holding barrel 14, and the second fixed lens holding barrel 15 that hold the entire lens system, as well as the diaphragm mechanism portion 26 and the first to third drive mechanism portions 32 to 34 that drive lenses are supported by the fixed barrel 10 that is a single member. A unit that includes the fixed barrel 10, the entire lens system that is supported by the fixed barrel 10, and a mechanism for driving the lens system is referred to as "optical system unit 5".

The fixed barrel 10 is housed inside the substantially cylindrical exterior member 4 that includes one or a plurality of members and encloses the circumference of the fixed barrel 10, and is fixed at a predetermined position to the mount portion 2.

As shown in FIG. 2 and FIG. 3, a seal member 4a is provided between the outer circumference in the vicinity of an end portion on the object side of the fixed barrel 10 and the exterior member 4. The seal member 4a is arranged in intimate contact with the fixed barrel 10 and the exterior member 4. Although not shown in the accompanying drawings, a seal member is also arranged in intimate contact with the exterior member 4 and the mount portion 2 between the inner circumference of an end portion on the image side of the exterior member 4 and the mount portion 2. Accordingly, the outer circumferential portion of the fixed barrel 10 (optical system unit 5) is covered in a watertight condition by the exterior member 4, the mount portion 2, and the seal members, except for opening portions at both ends in the optical axis direction through which the first lens group 21 and the fifth lens group 25 are exposed.

That is, the lens barrel 1 of the present embodiment has a so-called "drip-proof and dust-proof structure" that prevents the entry of liquid and dust into the optical system unit 5. Further, by covering the optical system unit 5 that has mechanisms for driving the lens system in this manner with the exterior member 4, the mount portion 2, and the seal members, the sound of operations of the optical system unit 5 can be prevented from leaking to outside of the lens barrel 1.

As shown in FIG. 4, it is possible to detach the fixed barrel 10 from the exterior member 4 and the mount portion 2 while maintaining the state of the optical system unit 5 that supports the entire lens system and mechanisms for driving the lens system.

By having the optical system unit 5 in which the entire lens system and mechanisms for driving the lens system are supported by the fixed barrel 10 that is a single member as described above, work to assemble and adjust the lens barrel 1 of the present embodiment can be performed with ease. For example, work to assemble the entire lens system and mechanisms for driving the lens system while adjusting the relative positions of these components in the fixed barrel 10 that is a single member is easier to perform than work to assemble an entire lens system and mechanisms for driving the lens system while adjusting the relative positions of these components in a barrel member that is constituted by a plurality of members. Further, since the optical system unit 5 includes all of the members that relate to the optical performance of the lens barrel 1, it is possible to simplify the assembly work of the entire lens barrel 1 by assembling the optical system unit 5 in advance so as to have a predetermined performance in a different process to the process to assemble the entire lens barrel 1.

Further, in the optical system unit 5, the first lens group 21 and the fifth lens group 25 whose positions are fixed with respect to the fixed barrel 10 are held at both ends in the optical axis direction of the substantially cylindrical fixed barrel 10 that is a single member. That is, opening portions at both ends of the substantially cylindrical fixed barrel 10 are blocked off by the first lens group 21 and the fifth lens group 25 whose respective positions are fixed.

By arranging the first lens group 21 and the fifth lens group 25 whose positions are fixed at both ends in the optical axis direction of the fixed barrel 10 in this manner, entry of liquid or dust into the optical system unit 5 from the two end portions in the optical axis direction of the optical system unit 5 can be prevented.

In addition, because the fixed barrel 10 is a single member, the total length of the optical system unit 5 does not change. Preventing entry of liquid or dust into the optical system unit 5 whose total length does not change and whose two end portions in the optical axis direction are blocked off by the lenses that are fixed in this manner can be easily achieved with a simple configuration in which, as described above, the outer circumference of the optical system unit 5 is enclosed by the exterior member 4, the mount portion 2, and the seal members.

Next, the detailed configuration of the optical system unit 5 will be described.

Figure 5:
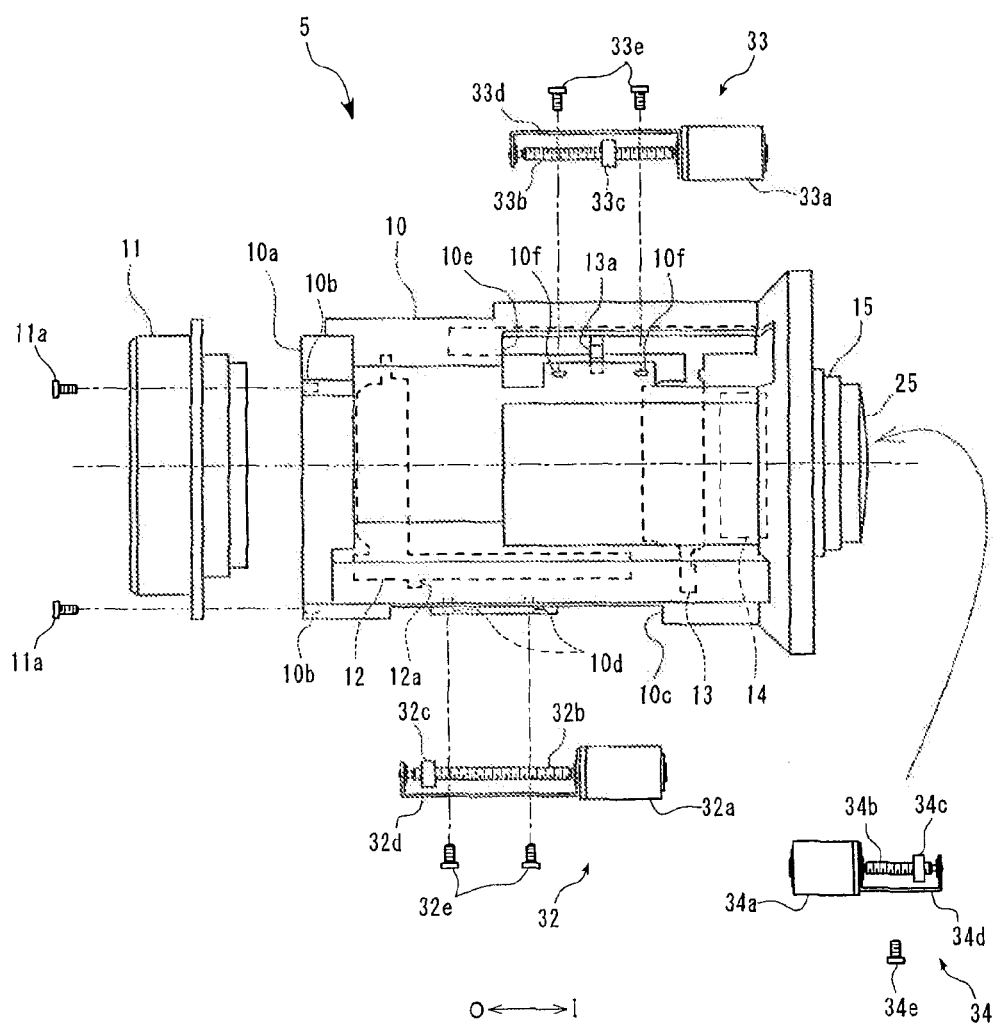
FIG. 5 is an exposed view showing a state in which drive mechanism portions are detached from an optical system unit.
Figure 6:
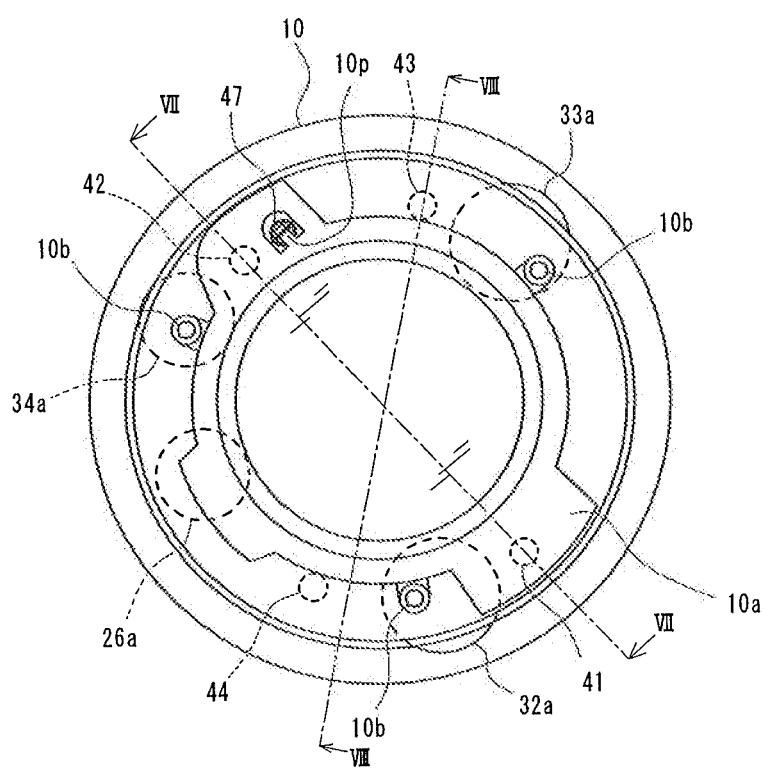
FIG. 6 is a view of a fixed barrel in a state in which a first fixed lens holding barrel is detached therefrom, as seen from an object side along an optical axis.

FIG. 5 illustrates a state in which the first fixed lens holding barrel 11, the first drive mechanism portion 32, the second drive mechanism portion 33, and the third drive mechanism portion 34 have been detached from the fixed barrel 10. FIG. 6 is a view of the fixed barrel 10 in a state in which the first fixed lens holding barrel 11 has been detached therefrom, as seen from the object side along the optical axis.

The first fixed lens holding barrel 11 is a substantially cylindrical barrel member that holds the first lens group 21, and is fixed by a plurality of screws 11a to an object-side end portion 10a of the fixed barrel 10. The screws 11a are screwed into a plurality of screw holes 10b provided in the fixed barrel 10.

As shown as one example in FIG. 5, in the optical system unit 5 of the present embodiment, the first drive mechanism portion 32, the second drive mechanism portion 33, and the third drive mechanism portion 34 can be mounted to the fixed barrel 10 from outside of the fixed barrel 10. As described in detail later, the first drive mechanism portion 32, the second drive mechanism portion 33, and the third drive mechanism portion 34 include electric motors 32a, 33a, and 34a, respectively, that each have a rotating output shaft. In addition, the diaphragm mechanism portion 26 includes a diaphragm drive motor 26a that is an electric motor for driving the diaphragm.

That is, four electric motors are arranged in the optical system unit 5 of the present embodiment. As shown in FIG. 6, in the present embodiment, the electric motors 32a, 33a, and 34a and the diaphragm drive motor 26a that are the aforementioned four electric motors are dispersedly disposed in the circumferential direction on the outer circumferential portion of the optical system unit 5 so as not to overlap with each other when viewed from a direction along the optical axis. By dispersedly disposing the electric motors 32a, 33a, and 34a and the diaphragm drive motor 26a for which a projected area onto a plane that is orthogonal to the optical axis is comparatively large in the circumferential direction so as not to overlap with each other when viewed from the direction along the optical axis, it is possible to prevent enlargement of the diameter of the lens barrel 1 that includes the plurality of electric motors.

As shown in FIG. 5, the first drive mechanism portion 32 includes the electric motor 32a that has the rotating output shaft, a screw 32b that is provided so as to be capable of rotating together with the output shaft of the electric motor 32a, a nut 32c that screws together with the screw 32b, and a support portion 32d that supports the electric motor 32a and the screw 32b.

An opening portion 10c that is a through-hole for accommodating the first drive mechanism portion 32 is formed in the outer circumferential portion of the fixed barrel 10. A plurality of screw holes 10d in which a plurality of screws 32e are screwed are formed in the vicinity of the fixed barrel 10. The support portion 32d of the first drive mechanism portion 32 is fixed to the fixed barrel 10 from the outer side by the plurality of screws 32e. In a state in which the support portion 32d is fixed to the fixed barrel 10, the electric motor 32a, the screw 32b, and the nut 32c are positioned on the inner side of the fixed barrel 10 through the opening portion 10c. Further, in a state in which the support portion 32d is fixed to the fixed barrel 10, the rotational axis of the screw 32b is approximately parallel to the optical axis.

In a state in which the support portion 32d is fixed to the fixed barrel 10, rotation of the nut 32c around the rotational axis of the screw 32b is restricted. Rotation of the nut 32c is restricted by the nut 32c coming in contact with the support portion 32d, the fixed barrel 10, or the first moving lens holding barrel 12. A configuration that restricts rotation of the nut 32c is not particularly limited. Because rotation of the nut 32c is restricted, the nut 32c moves rectilinearly in a direction along the optical axis accompanying rotation of the screw 32b. That is, the first drive mechanism portion 32 has a configuration that converts rotational motion of the electric motor 32a into rectilinear motion of the nut 32c.

The nut 32c is arranged so as to be capable of pushing the first moving lens holding barrel 12 at least towards the object side along the optical axis by engaging with a nut engaging portion 12a of the first moving lens holding barrel 12, described later, that is supported so as to be movable in the optical axis direction inside the fixed barrel 10.

Similarly to the first drive mechanism portion 32, the second drive mechanism portion 33 includes an electric motor 33a having a rotating output shaft, a screw 33b that is provided so as to be capable of rotating together with the output shaft of the electric motor 33a, a nut 33c that screws together with the screw 33b, and a support portion 33d that supports the electric motor 33a and the screw 33b.

The second drive mechanism portion 33 is fixed to the fixed barrel 10 from the outer side by a plurality of screws 33e that are screwed into a plurality of screw holes 10f of the fixed barrel 10, and is accommodated on the inner side of the fixed barrel 10 through an opening portion 10e provided in an outer circumferential portion of the fixed barrel 10. In this case, in a state in which the support portion 33d is fixed to the fixed barrel 10, the rotational axis of the screw 33b is approximately parallel to the optical axis.

The nut 33c of the second drive mechanism portion 33 is arranged so as to be capable of pushing the second moving lens holding barrel 13 at least towards the object side along the optical axis by engaging with a nut engaging portion 13a of the second moving lens holding barrel 13, described later, that is supported so as to be movable in the optical axis direction inside the fixed barrel 10.

Similarly to the first drive mechanism portion 32, the third drive mechanism portion 34 also includes an electric motor 34a having a rotating output shaft, a screw 34b that is provided so as to be capable of rotating together with the output shaft of the electric motor, a nut 34c that screws together with the screw, and a support portion 34d that supports the electric motor 34a and the screw. In the third drive mechanism portion 34, the support portion 34d is fixed to the fixed barrel 10 from the outside by a screw 34e, and is accommodated on the inner side of the fixed barrel 10 through an unshown opening portion provided in the outer circumferential portion of the fixed barrel 10. In this case, in a state in which the support portion is fixed to the fixed barrel 10, the rotational axis of the screw 34b is approximately parallel to the optical axis.

The nut 34c of the third drive mechanism portion 34 is arranged so as to be capable of pushing the third moving lens holding barrel 14 at least towards the image side along the optical axis by engaging with a nut engaging portion 14a of the third moving lens holding barrel 14, described later, that is supported so as to be movable in the optical axis direction inside the fixed barrel 10.

As described in the foregoing, according to the present embodiment it is possible to install the first drive mechanism portion 32, the second drive mechanism portion 33, and the third drive mechanism portion 34 in the fixed barrel 10 from the outside of the fixed barrel 10 in a state in which the first drive mechanism portion 32, the second drive mechanism portion 33, and the third drive mechanism portion 34 are respectively assembled. Work to assemble the optical system unit 5 can be easily performed by making each of the first drive mechanism portion 32, the second drive mechanism portion 33, and the third drive mechanism portion 34 that include a plurality of components into the state of a pre-assembled unit in advance in this manner, and enabling fixing of the pre-assembled units from the outside of the fixed barrel 10.

Figure 7:
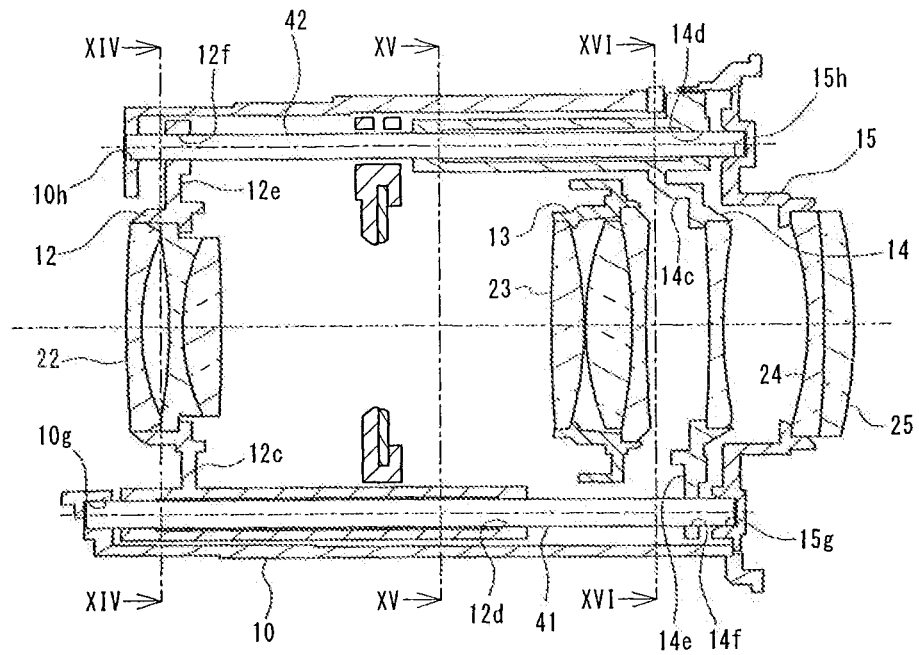
FIG. 7 is a cross-sectional view along a line VII-VII in FIG. 6.
Figure 8:
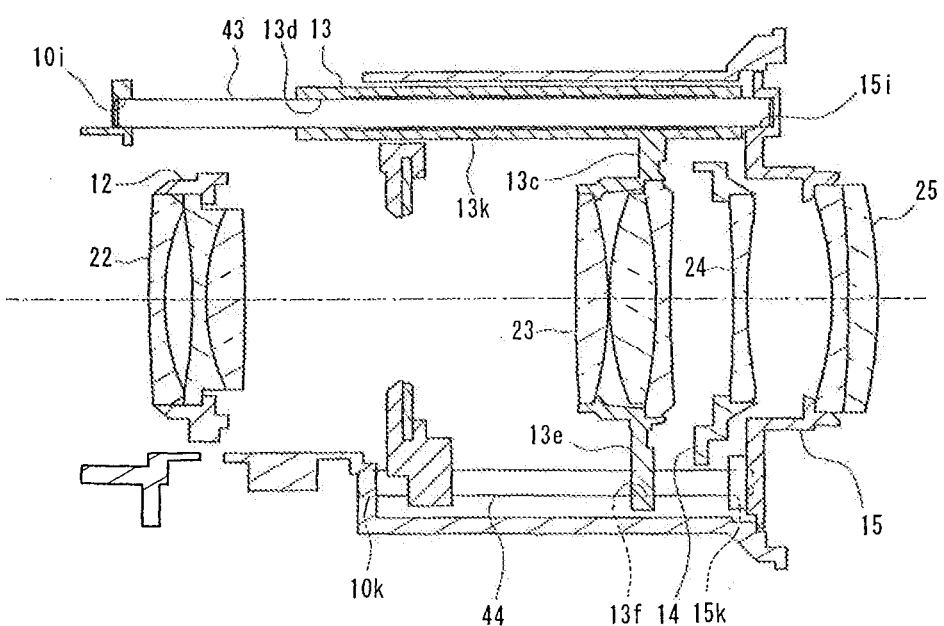
FIG. 8 is a cross-sectional view along a line VIII-VIII in FIG. 6.
Figure 9:
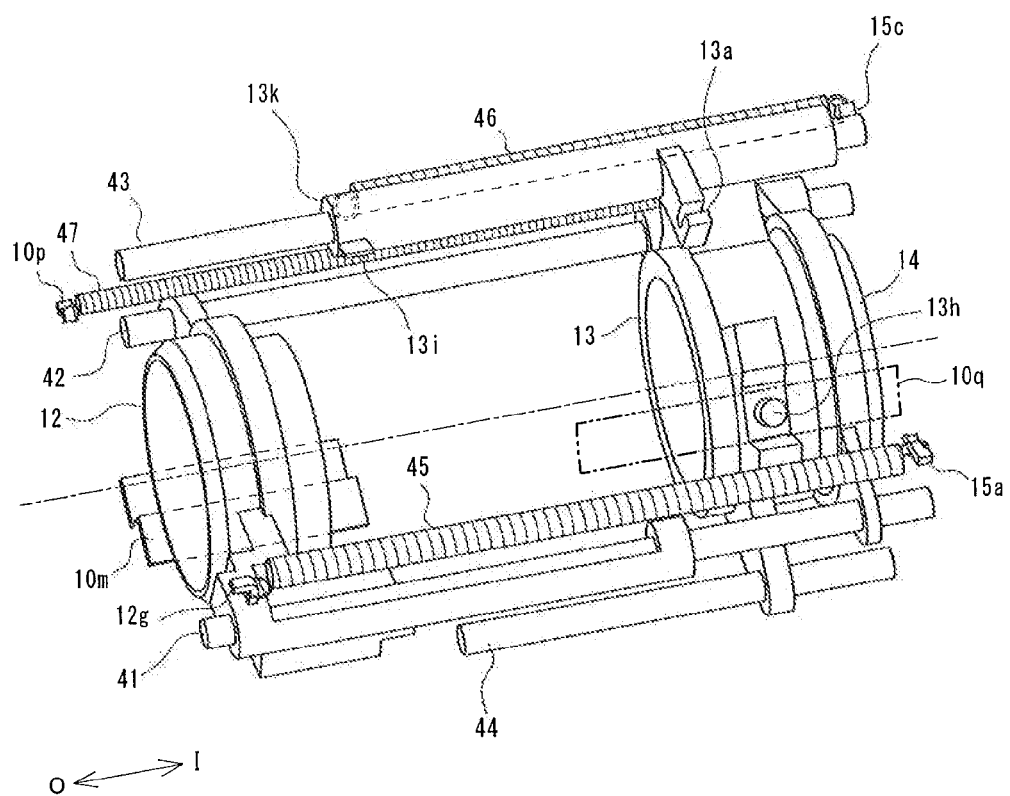
FIG. 9 is perspective view in which only members associated with a support mechanism of a first moving lens holding barrel, a second moving lens holding barrel, and a third moving lens holding barrel inside the fixed barrel are visualized.

Next, the configurations of the first moving lens holding barrel 12, the second moving lens holding barrel 13, and the third moving lens holding barrel 14 that are supported so as to be movable in the optical axis direction inside the fixed barrel 10 are described. FIG. 7 is a cross-sectional view along a line VII-VII in FIG. 6, and is a view for describing a support mechanism of the first moving lens holding barrel 12 and the third moving lens holding barrel 14. FIG. 8 is a cross-sectional view along a line VIII-VIII in FIG. 6, and is a view for describing a support mechanism of the second moving lens holding barrel 13. FIG. 9 is a perspective view in which only members relating to the support mechanism of the first moving lens holding barrel 12, the second moving lens holding barrel 13, and the third moving lens holding barrel 14 are visualized inside the fixed barrel 10.

Figure 14:
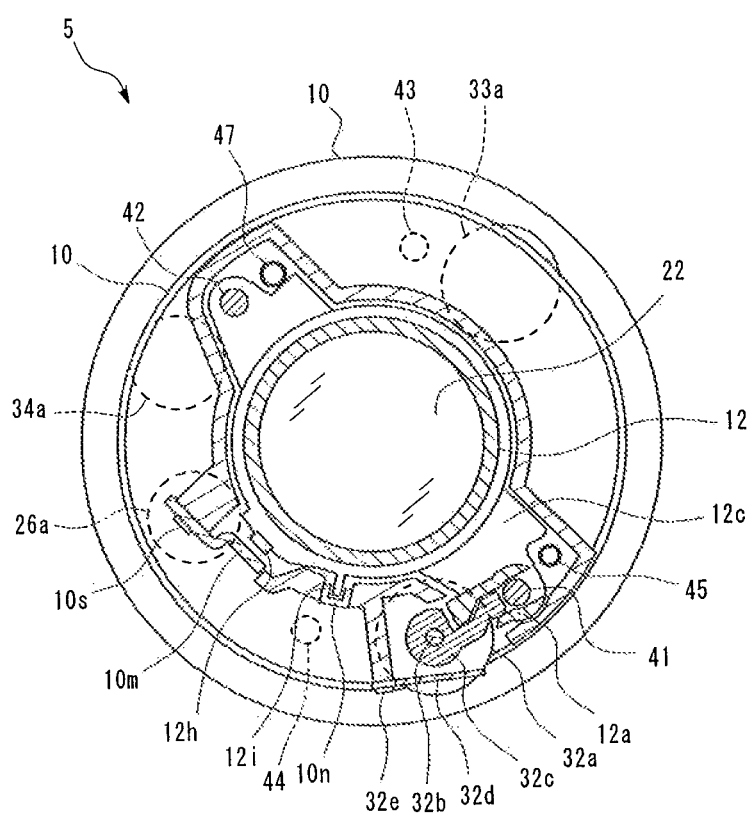
FIG. 14 is a cross-sectional view along a line XIV-XIV in FIG. 7.
Figure 15:
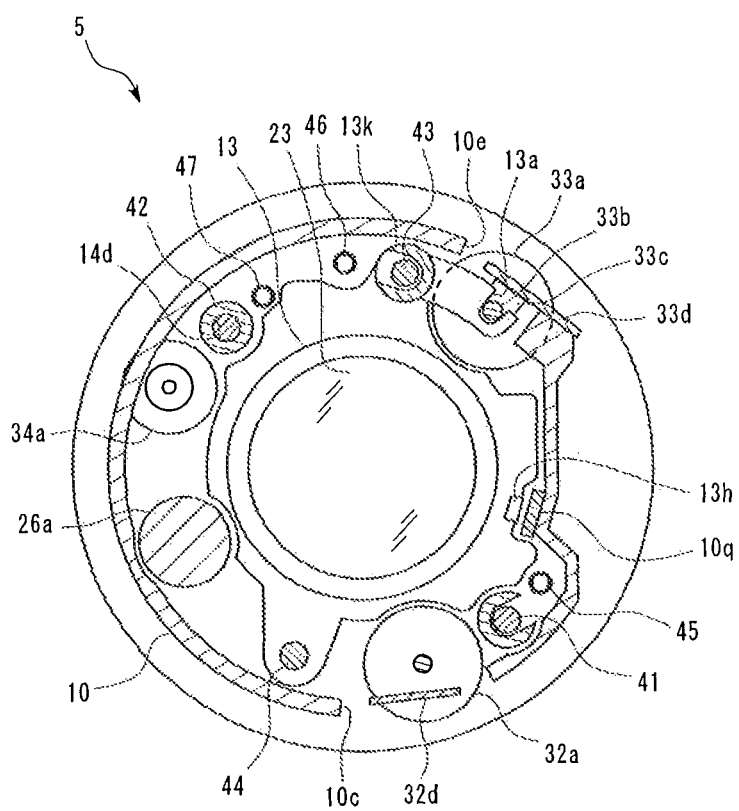
FIG. 15 is a cross-sectional view along a line XV-XV in FIG. 7.
Figure 16:
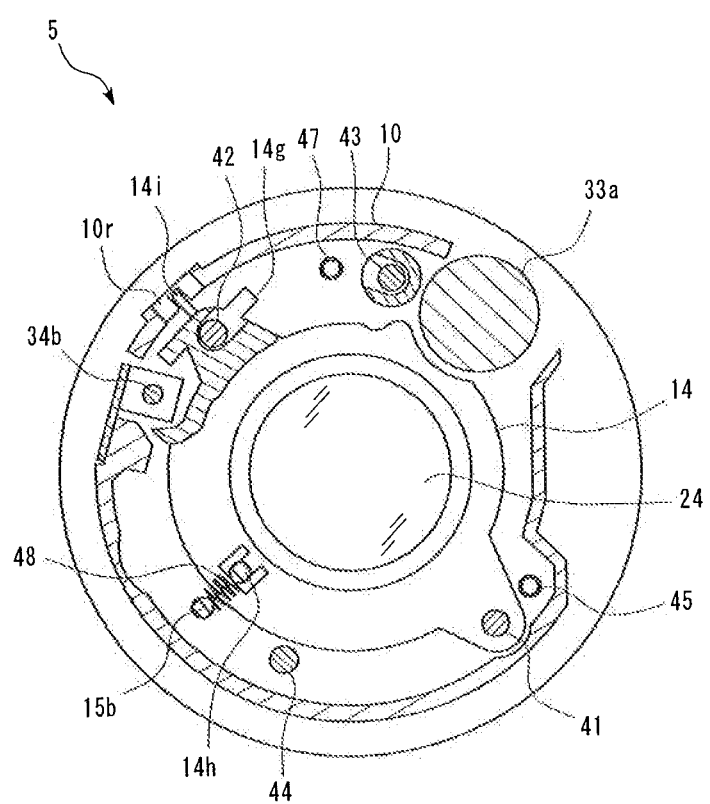
FIG. 16 is a cross-sectional view along a line XVI-XVI in FIG. 7.

FIG. 10, FIG. 11, FIG. 12, and FIG. 13 are views of the first moving lens holding barrel 12, the second moving lens holding barrel 13, the third moving lens holding barrel 14, and the second fixed lens holding barrel 15, respectively, as seen from the object side along the optical axis. FIG. 14 is a cross-sectional view along a line XIV-XIV in FIG. 7. FIG. 15 is a cross-sectional view along a line XV-XV in FIG. 7. FIG. 16 is a cross-sectional view along a line XVI-XVI in FIG. 7.

As shown in FIG. 6 and FIG. 9, inside the fixed barrel 10, a first guide shaft 41, a second guide shaft 42, a third guide shaft 43, and a fourth guide shaft 44 that are four linear cylindrical shaft-like (columnar) members are arranged in the vicinity of the inner circumferential face of the fixed barrel 10. The first guide shaft 41, the second guide shaft 42, the third guide shaft 43, and the fourth guide shaft 44 are each fixed so as to be approximately parallel to the optical axis.

Of these four guide shafts, the pair of the first guide shaft 41 and the second guide shaft 42 are arranged at positions that are approximately axially symmetric with respect to the optical axis, and the other pair of the third guide shaft 43 and the fourth guide shaft 44 are also arranged at positions that are approximately axially symmetric with respect to the optical axis.

Specifically, as shown in FIG. 7, the pair of the first guide shaft 41 and the second guide shaft 42 are fixed inside the fixed barrel 10 by the end portions on the object side of the first guide shaft 41 and the second guide shaft 42 fitting into holes 10g and 10h, respectively, that are formed in the inner face of the fixed barrel 10, and the end portions on the image side of the first guide shaft 41 and the second guide shaft 42 fitting into holes 15g and 15h, respectively, that are formed in the second fixed lens holding barrel 15 that is fixed to the fixed barrel 10.

Further, as shown in FIG. 8, the pair of the third guide shaft 43 and the fourth guide shaft 44 are fixed inside the fixed barrel 10 by the end portions on the object side of the third guide shaft 43 and the fourth guide shaft 44 fitting into holes 10i and 10k, respectively, that are formed in the fixed barrel 10, and the end portions on the image side of the third guide shaft 43 and the fourth guide shaft 44 fitting into holes 15i and 15k, respectively, that are formed in the second fixed lens holding barrel 15 that is fixed to the fixed barrel 10.

The first moving lens holding barrel 12 and the third moving lens holding barrel 14 are configured to slide along the pair of the first guide shaft 41 and the second guide shaft 42 so as to be guided approximately parallel to the optical axis. The second moving lens holding barrel 13 is configured to slide along the pair of the third guide shaft 43 and the fourth guide shaft 44 so as to be guided approximately parallel to the optical axis.

Figure 10:
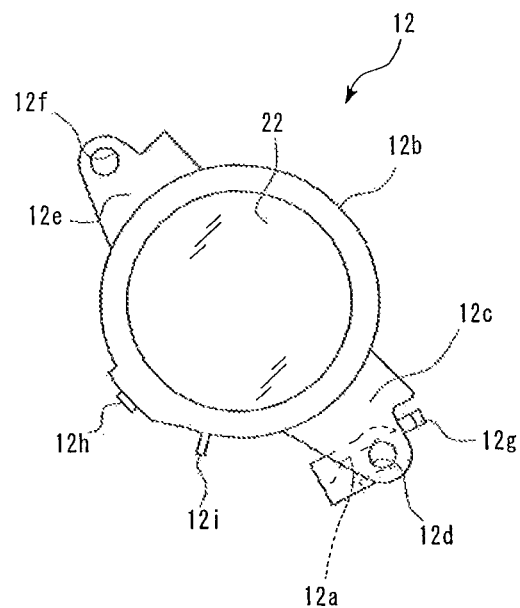
FIG. 10 is a front view of the first moving lens holding barrel.

More specifically, as shown in FIG. 10, the first moving lens holding barrel 12 includes an approximately cylindrical holding portion 12b that holds the second lens group 22, and a pair of flange portions 12c and 12e that extend in opposite directions sandwiching the optical axis therebetween towards the outside in the radial direction from the holding portion 12b.

The nut engaging portion 12a that engages with the nut 32c of the first drive mechanism portion 32 that is described above, and a slide hole 12d in which the first guide shaft 41 fits with a predetermined clearance are formed in the flange portion 12c. The fit between the slide hole 12d and the first guide shaft 41 is a so-called "clearance fit" state. As shown in FIG. 7, the slide hole 12d is formed inside a sleeve that protrudes towards the image side along the optical axis from the plate-shaped flange portion 12c, and a fitting length between the slide hole 12d and the first guide shaft 41 is comparatively long.

A slide hole 12f into which the second guide shaft 42 fits with a predetermined clearance is formed in the other flange portion 12e. The fit between the slide hole 12f and the second guide shaft 42 is a so-called "clearance fit" state. As shown in FIG. 7, the slide hole 12f is a hole portion that passes through the plate-shaped flange portion 12e. The fitting length between the slide hole 12f and the second guide shaft 42 is short in comparison to the fitting length between the slide hole 12d and the first guide shaft 41.

According to the present embodiment, inclination of the first moving lens holding barrel 12 with respect to the optical axis is restricted by the fit between the slide hole 12d and the first guide shaft 41 which has a long fitting length, and rotation of the first moving lens holding barrel 12 around the first guide shaft 41 is restricted by the fit between the slide hole 12f and the second guide shaft 42 which has a short fitting length.

Further, the nut engaging portion 12a that is formed in the flange portion 12c is a site that is configured so that the nut 32c is capable of pressing the nut engaging portion 12a towards the object side along the optical axis. In other words, the nut engaging portion 12a is configured so as to at least contact against the nut 32c from the object side along the optical axis.

A spring latch portion 12g is also formed on the flange portion 12c. The spring latch portion 12g is a hook-shaped site to which one end of an extension coil spring 45 is latched. As shown in FIG. 9, the extension coil spring 45 extends along the optical axis, with one end thereof being latched to the spring latch portion 12g of the first moving lens holding barrel 12 and the other end being latched to a spring latch portion 15a formed on the second fixed lens holding barrel 15.

That is, the extension coil spring 45 generates a force that urges the nut engaging portion 12a of the first moving lens holding barrel 12 towards the nut 32c. The urging force of the extension coil spring 45 ensures that backlash is eliminated between the nut 32c and the screw 32b, and that the first moving lens holding barrel 12 tracks the movement of the nut 32c. According to the above described configuration, the first moving lens holding barrel 12 is driven in the optical axis direction by the first drive mechanism portion 32.

A magnet 12h is fixed to the outer circumferential portion of the holding portion 12b of the first moving lens holding barrel 12. The magnet 12h is arranged on a straight line that is approximately orthogonal in the vicinity of the optical axis to a straight line that joins the centers of the pair of slide holes 12d and 12f when the first moving lens holding barrel 12 is viewed from a direction along the optical axis.

As shown in FIG. 14, in a state in which the first moving lens holding barrel 12 is supported inside the fixed barrel 10, a plate-shaped magnetic member 10m made of iron or stainless steel that is a material having magnetic properties is fixed at a position facing the magnet 12h in the fixed barrel 10. As shown in FIG. 9, the magnetic member 10m extends approximately parallel to the optical axis, and is arranged so as to be separated by an approximately constant predetermined distance from the magnet 12h irrespective of the position in the optical axis direction of the first moving lens holding barrel 12.

By means of a magnetic force that attracts the magnet 12h and the magnetic member 10m that is fixed to the fixed barrel 10 to each other, the first moving lens holding barrel 12 is urged in a predetermined radial direction of the first guide shaft 41 and the second guide shaft 42. That is, by means of the magnetic force between the magnet 12h and the magnetic member 10m, the first moving lens holding barrel 12 is urged in a direction such that backlash is removed between the pair of slide holes 12d and 12f of the first moving lens holding barrel 12 and the first guide shaft 41 and the second guide shaft 42 that fit in the pair of slide holes 12d and 12f.

According to the conventional technology, in order to remove backlash of a moving lens holding barrel that slides along a round shaft, it is common to urge the moving lens holding barrel using an extension coil spring. However, according to this conventional technology, because the strength of the urging force varies depending on the amount of deformation of the coil spring, when the movement amount of the moving lens holding barrel is increased, it is necessary to strengthen the driving force of the moving lens holding barrel. However, according to the present embodiment, irrespective of the position in the optical axis direction of the first moving lens holding barrel 12, the distance between the magnetic member 10m and the magnet 12h is substantially constant and the urging force that is generated is approximately constant. Therefore, according to the present embodiment, it is possible to drive the first moving lens holding barrel 12 by means of the small electric motor 32a that has a low output.

Further, when an extension coil spring is arranged as in the conventional technology, it is necessary to arrange the extension coil spring along a radial direction of the optical axis in order to generate an urging force in a direction that removes backlash, and consequently the diameter of the optical system unit 5 increases due to the space required for arrangement of the extension coil spring. In comparison to this conventional technology, according to the present embodiment, the diameter of the optical system unit 5 is not enlarged.

A dog 12i that protrudes towards the outside in the radial direction is formed on the outer circumferential portion of the holding portion 12b of the first moving lens holding barrel 12. As shown in FIG. 14, the dog 12i is arranged so as to be capable of moving forward and rearward within a detection range of a photo-interrupter 10n that is fixed to the fixed barrel 10. The lens barrel 1 is configured so that an initial position of the electric motor 32a of the first drive mechanism portion 32 can be detected based on a detection result with respect to the dog 12i obtained by the photo-interrupter 10n.

Further, according to the present embodiment, as shown in FIG. 14, the screw 32b of the first drive mechanism portion 32 that drives the first moving lens holding barrel 12 is arranged at a position that is the same distance from the optical axis as the first guide shaft 41 that supports and guides the first moving lens holding barrel 12, or that is closer to the optical axis than the first guide shaft 41. In other words, a distance from the optical axis to the rotational shaft of the electric motor 32a of the first drive mechanism portion 32 is the same as or shorter than a distance from the optical axis to the first guide shaft 41.

By making the distance from the optical axis to the screw 32b of the first drive mechanism portion 32 equal to or shorter than the distance from the optical axis to the first guide shaft 41 in this manner, a protruding amount to the outside from the fixed barrel 10 of the electric motor 32a that is a member that has a comparatively large area when viewed from the optical axis direction can be reduced, and it is thereby possible to prevent enlargement of the diameter of the lens barrel 1.

Note that in the lens barrel 1 of the present embodiment, to make the distance from the optical axis to the screw 32b of the first drive mechanism portion 32 equal to or shorter than the distance from the optical axis to the first guide shaft 41, the nut 32c is configured so as to engage with the nut engaging portion 12a from a direction along the circumferential direction of the optical axis. Specifically, as shown in FIG. 17 and FIG. 18, the opening portion 10c of the fixed barrel 10 opens so as to expose the first guide shaft 41 and the nut engaging portion 12c towards one direction in the circumferential direction of the optical axis.

A hole portion 12aa that opens in approximately the same direction as the opening direction of the opening portion 10c is formed in the nut engaging portion 12c. That is, the hole portion 12aa of the nut engaging portion 12a opens towards one direction in the circumferential direction of the optical axis. In other words, the hole portion 12aa of the nut engaging portion 12a opens towards the outside in the radial direction of the first guide shaft 41. On the other hand, an arm portion 32ca is provided in the nut 32c. The arm portion 32ca extends to the outside in the radial direction from the rotational axis of the screw 32b, and is configured to be insertable into the hole portion 12aa. The nut 32c and the nut engaging portion 12a engage when the arm portion 32ca that extends from the nut 32c is inserted into the hole portion 12aa of the nut engaging portion 12a.

Figure 12:
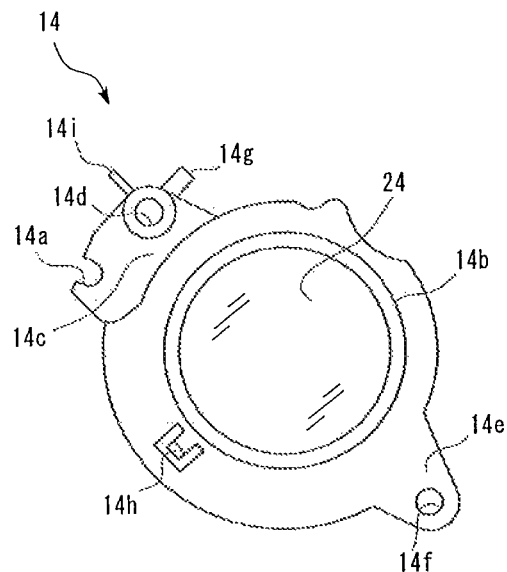
FIG. 12 is a front view of the third moving lens holding barrel.
Figure 13:
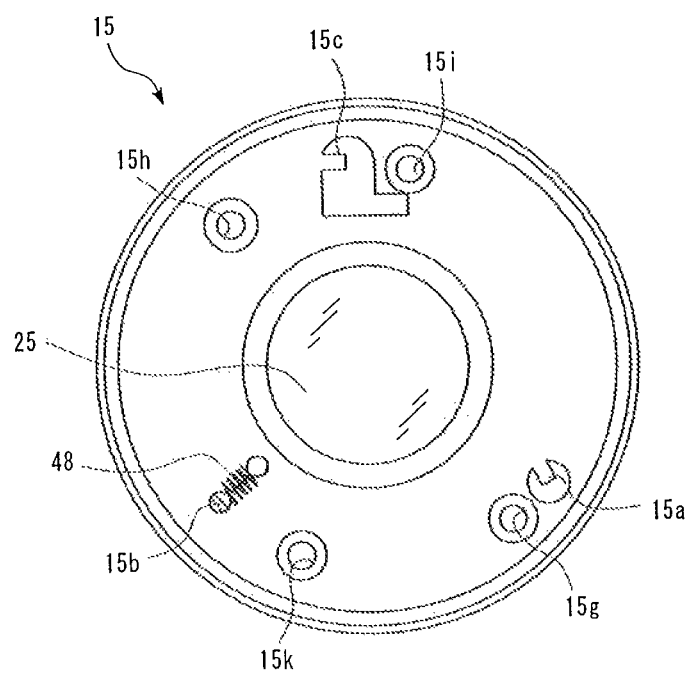
FIG. 13 is a front view of a second fixed lens holding barrel.
Figure 17:
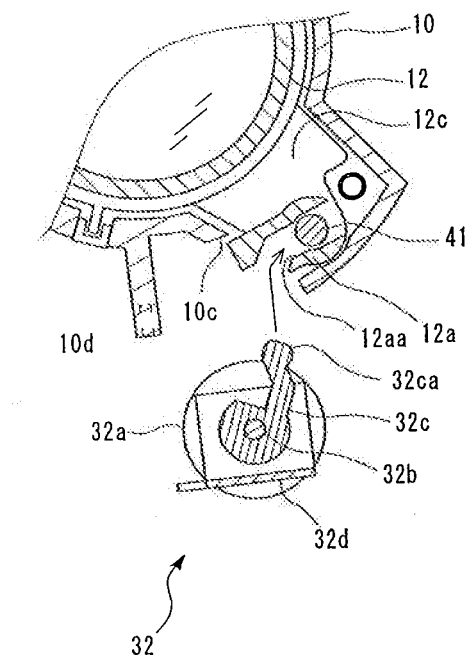
FIG. 17 is a partial cross-sectional view that illustrates a shape of a nut of a first drive mechanism portion and a nut engaging portion of a first moving lens holding barrel.
Figure 18:
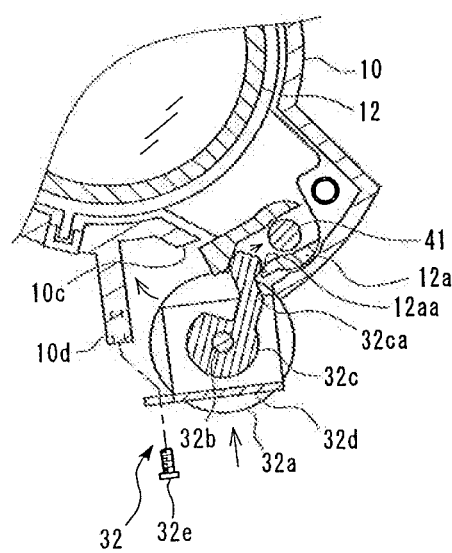
FIG. 18 is view for describing a method of assembling the first drive mechanism portion in the fixed barrel.

When the first drive mechanism portion 32 is fixed to the fixed barrel 10 from the outer side thereof, as shown in FIG. 17 and FIG. 18, in the opening portion 10c, while inserting the arm portion 32ca into the hole portion 12aa, the first drive mechanism portion 32 is brought near to the outer circumferential portion of the fixed barrel 10 and is fixed thereto by the screw 32e. As shown in FIG. 12, the third moving lens holding barrel 14 includes an approximately cylindrical holding portion 14b that holds the fourth lens group 24, and a pair of flange portions 14c and 14e that extend in opposite directions sandwiching the optical axis therebetween towards the outside in the radial direction from the holding portion 14b.

The nut engaging portion 14a that engages with the nut of the third drive mechanism portion 34 and a slide hole 14d into which the second guide shaft 42 fits with a predetermined clearance are formed in the flange portion 14c. The fit between the slide hole 14d and the second guide shaft 42 is a so-called "clearance fit" state. As shown in FIG. 7, the slide hole 14d is formed inside a sleeve that protrudes towards the object side along the optical axis from the plate-shaped flange portion 14c, and a fitting length between the slide hole 14d and the second guide shaft 42 is comparatively long.

A slide hole 14f into which the first guide shaft 41 fits with a predetermined clearance is formed in the other flange portion 14e. The fit between the slide hole 14f and the first guide shaft 41 is a so-called "clearance fit" state. As shown in FIG. 7, the slide hole 14f is a hole portion that passes through the plate-shaped flange portion 14e. The fitting length between the slide hole 14f and the first guide shaft 41 is short in comparison to the fitting length between the slide hole 14d and the second guide shaft 42.

According to the present embodiment, inclination of the third moving lens holding barrel 14 with respect to the optical axis is restricted by the fit between the slide hole 14d and the second guide shaft 42 which has a long fitting length, and rotation of the third moving lens holding barrel 14 around the second guide shaft 42 is restricted by the fit between the slide hole 14f and the first guide shaft 41 which has a short fitting length.

As described above, although the first moving lens holding barrel 12 and the third moving lens holding barrel 14 are guided so as to move in the optical axis direction by the first guide shaft 41 and second guide shaft 42 as a common pair guide shafts, the slide holes 12d and 14d that each have a long fitting length are configured so that the different first guide shaft 41 and second guide shaft 42 fit therein, respectively. By adopting a configuration in which, with respect to a pair of moving lens holding barrels that slide along a common pair of guide shafts, different guide shafts fit into separate slide holes that each have a long fitting length in this way, it is possible to make the fitting length of the slide holes longer while keeping the distance that the respective moving lens holding barrels are capable of moving as a long distance.

Further, the nut engaging portion 14a formed in the flange portion 14c of the third moving lens holding barrel is a site that is configured so that the nut 34c of the third drive mechanism portion 34 is capable of pressing the nut engaging portion 14a towards the image side along the optical axis.

A spring latch portion 14g is also formed on the flange portion 14c. As shown in FIG. 12, the spring latch portion 14g is a hook-shaped site to which one end of an extension coil spring 47 is latched. The extension coil spring 47 extends along the optical axis, with one end thereof being latched to the spring latch portion 14g of the third moving lens holding barrel 14 and the other end being latched to a spring latch portion 10p formed on the fixed barrel 10.

The extension coil spring 47 generates a force that urges the nut engaging portion 14a of the third moving lens holding barrel 14 towards the nut 34c. The urging force of the extension coil spring 47 ensures that backlash between the nut 34c of the third drive mechanism portion 34 and the screw is eliminated, and that the third moving lens holding barrel 14 tracks the movement of the nut 34c. According to the above described configuration, the third moving lens holding barrel 14 is driven in the optical axis direction by the third drive mechanism portion 34.

Further, a spring latch portion 14h is formed on the outer circumferential portion of the holding portion 14b of the third moving lens holding barrel 14. As shown in FIG. 16, in the second fixed lens holding barrel 15 that is fixed to the fixed barrel 10, a spring latch portion 15b is formed on the outer side in the radial direction of the spring latch portion 14h in a state in which the third moving lens holding barrel 14 is supported inside the fixed barrel 10. The two end portions of an extension coil spring 48 are latched to the spring latch portion 14h of the third moving lens holding barrel 14 and the spring latch portion 15b of the second fixed lens holding barrel 15. By means of the urging force of the extension coil spring 48, backlash is eliminated between the pair of slide holes 14d and 14f of the third moving lens holding barrel 14 and the second guide shaft 42 and first guide shaft 41 that fit in the pair of slide holes 14d and 14f. With regard to the fourth lens group 24 that the third moving lens holding barrel 14 holds, since the fourth lens group 24 is a wobbling lens group and a movement amount thereof in the optical axis direction is very small, the amount of fluctuation in an urging force produced by urging using the extension coil spring 48 is very small. Further, since the outer diameter of the fourth lens group 24 that is a wobbling lens group is comparatively small compared to the outer diameter of the optical system unit 5, even when the extension coil spring 48 is arranged along the radial direction, since the extension coil spring 48 can be fitted at a position that is further on the inner side than the four guide shafts 41 to 44, the diameter of the optical system unit 5 does not become large.

A dog 14i that protrudes towards the outside is formed on the flange portion 14c of the third moving lens holding barrel 14. As shown in FIG. 16, the dog 14i is arranged so as to be capable of moving forward and rearward in a detection range of a photo-interrupter 10r that is fixed to the fixed barrel 10. The lens barrel 1 is configured so that an initial position of the electric motor 34a of the third drive mechanism portion 34 can be detected based on a detection result with respect to the dog 14i obtained by the photo-interrupter 10r.

Further, according to the present embodiment, as shown in FIG. 16, the screw 34b of the third drive mechanism portion 34 that drives the third moving lens holding barrel 14 is arranged at a position at which a distance from the optical axis is approximately the same as that from the optical axis to the second guide shaft 42 that supports and guides the third moving lens holding barrel 14. By bringing the third drive mechanism portion 34 close to the optical axis in this manner, similarly to the first drive mechanism portion 32, a protruding amount to the outside from the fixed barrel 10 of the electric motor 34a that is a member that has a comparatively large area when viewed from the optical axis direction can be reduced, and thus enlargement of the diameter of the lens barrel 1 can be prevented.

Figure 11:
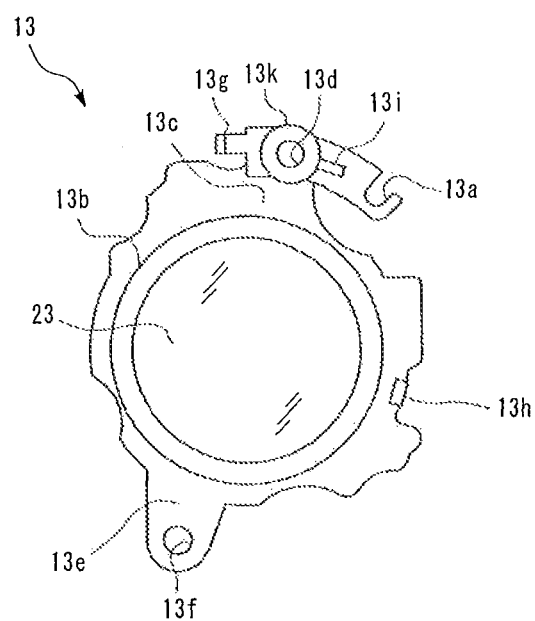
FIG. 11 is a front view of the second moving lens holding barrel.

As shown in FIG. 8 and FIG. 9, the second moving lens holding barrel 13 is configured so as to slide along the pair of the third guide shaft 43 and the fourth guide shaft 44, and be guided approximately parallel to the optical axis. As shown in FIG. 11, the second moving lens holding barrel 13 includes an approximately cylindrical holding portion 13b that holds the third lens group 23, and a pair of flange portions 13c and 13e that extend in opposite directions sandwiching the optical axis therebetween towards the outside in the radial direction from the holding portion 13b.

The nut engaging portion 13a that engages with the nut 33c of the second drive mechanism portion 33 that is described above, and a slide hole 13d into which the third guide shaft 43 fits with a predetermined clearance are formed in the flange portion 13c. The fit between the slide hole 13d and the third guide shaft 43 is a so-called "clearance fit" state. As shown in FIG. 8, the slide hole 13d is formed in a sleeve-like cylindrical portion 13k that protrudes towards the object side along the optical axis from the plate-shaped flange portion 13c, and a fitting length between the slide hole 13d and the third guide shaft 43 is comparatively long.

A slide hole 13f into which the fourth guide shaft 43 fits with a predetermined clearance is formed in the other flange portion 13e. The fit between the slide hole 13f and the fourth guide shaft 44 is a so-called "clearance fit" state. As shown in FIG. 8, the slide hole 13f is a hole portion that passes through the plate-shaped flange portion 13e. A fitting length between the slide hole 13f and the fourth guide shaft 44 is short in comparison to the fitting length between the slide hole 13d and the third guide shaft 43.

According to the present embodiment, inclination of the second moving lens holding barrel 13 with respect to the optical axis is restricted by the fit between the slide hole 13d and the third guide shaft 43 which has a long fitting length, and rotation of the second moving lens holding barrel 13 around the third guide shaft 43 is restricted by the fit between the slide hole 13f and the fourth guide shaft 44 which has a short fitting length.

The nut engaging portion 13a that is formed in the flange portion 13c is a site that is configured so that the nut 33c is capable of pressing the nut engaging portion 13a towards the object side along the optical axis. In other words, the nut engaging portion 13a is configured so as to at least contact against the nut 33c from the object side along the optical axis.

A spring latch portion 13g is formed in the vicinity of an end portion of the object side of the cylindrical portion 13k that is provided so as to protrude towards the object side from the flange portion 13c. The spring latch portion 13g is a hook-shaped site to which one end of an extension coil spring 46 is latched. As shown in FIG. 9, the extension coil spring 46 extends along the optical axis, with one end thereof being latched to the spring latch portion 13g of the second moving lens holding barrel 13 and the other end being latched to a spring latch portion 15c of the second fixed lens holding barrel 15 that is formed on the fixed barrel 10.

That is, the extension coil spring 46 generates a force that urges the nut engaging portion 13a of the second moving lens holding barrel 13 towards the nut 33c. The urging force of the extension coil spring 46 ensures that backlash between the nut 33c and the screw 33b is eliminated, and that the second moving lens holding barrel 13 tracks the movement of the nut 33c. According to the above described configuration, the second moving lens holding barrel 13 is driven in the optical axis direction by the second drive mechanism portion 33.

A magnet 13h is fixed to the outer circumferential portion of the holding portion 13b of the second moving lens holding barrel 13. The magnet 13h is arranged on a straight line that is approximately orthogonal in the vicinity of the optical axis to a straight line that joins the centers of the pair of slide holes 13d and 13f when the second moving lens holding barrel 13 is viewed from a direction along the optical axis.

As shown in FIG. 15, in a state in which the second moving lens holding barrel 13 is supported inside the fixed barrel 10, a plate-shaped magnetic member 10q made of iron or stainless steel that is a material having magnetic properties is fixed at a position facing the magnet 13h in the fixed barrel 10. As shown in FIG. 9, the magnetic member 10q extends approximately parallel to the optical axis, and is arranged so as to be separated by an approximately constant predetermined distance from the magnet 13h irrespective of the position in the optical axis direction of the second moving lens holding barrel 13.

By means of a magnetic force that attracts the magnet 13h and the magnetic member 10q that is fixed to the fixed barrel 10 to each other, the second moving lens holding barrel 13 is urged in a predetermined radial direction of the third guide shaft 43 and the fourth guide shaft 44. That is, by means of the magnetic force between the magnet 13h and the magnetic member 10q, the second moving lens holding barrel 13 is urged in a direction such that backlash is removed between the pair of slide holes 13d and 13f of the second moving lens holding barrel 13 and the third guide shaft 43 and the fourth guide shaft 44 that fit in the pair of slide holes 13d and 13f. This effect is similar to that in the case of the first moving lens holding barrel 12.

Further, a protruding dog 13i is formed in the vicinity of the end portion on the object side of the cylindrical portion 13k of the second moving lens holding barrel 13. The dog 13i is arranged so as to be capable of moving forward and rearward in a detection range of an unshown photo-interrupter that is fixed to the fixed barrel 10. The lens barrel 1 is configured so that an initial position of the electric motor 33a of the second drive mechanism portion 33 can be detected based on a detection result with respect to the dog 13i obtained by the photo-interrupter.

Further, according to the present embodiment, as shown in FIG. 15, the screw 33b of the second drive mechanism portion 33 that drives the second moving lens holding barrel 13 is arranged at a position at which a distance from the optical axis is approximately the same as that from the optical axis to the third guide shaft 43 that supports and guides the second moving lens holding barrel 13. By bringing the second drive mechanism portion 33 close to the optical axis in this manner, similarly to the first drive mechanism portion 32, a protruding amount to the outside from the fixed barrel 10 of the electric motor 33a that is a member that has a comparatively large area when viewed from the optical axis direction can be reduced, and thus enlargement of the diameter of the lens barrel 1 can be prevented.

As described above, the present embodiment has a configuration in which the first moving lens holding barrel 12, the second moving lens holding barrel 13, and the third moving lens holding barrel 14 that are three moving lens holding barrels are supported so as to be movable along the optical axis using the first guide shaft 41, the second guide shaft 42, the third guide shaft 43, and the fourth guide shaft 44 that are four cylindrical shaft-like guide shafts. In this case, according to the present embodiment, a configuration is adopted so that the first moving lens holding barrel 12 and the second moving lens holding barrel 13 whose movement amounts are comparatively large are supported by respectively different pairs of guide shafts. Specifically, the first moving lens holding barrel 12 is supported by the first guide shaft 41 and the second guide shaft 42, and the second moving lens holding barrel 13 is supported by the third guide shaft 43 and the fourth guide shaft 44. According to the present embodiment having this configuration, by using one set of guide shafts to support two moving lens holding barrels, the number of guide shafts can be reduced and the size of the lens barrel 1 can be deceased. In addition, by using different sets of guide shafts to support the first moving lens holding barrel 12 and the second moving lens holding barrel 13 whose movement amounts are comparatively large, the fitting lengths between the respective moving lens holding barrels and the corresponding guide shafts can be lengthened as much as possible to thereby allow the two moving lens holding barrels to move by large amounts in the optical axis direction. If the fitting length between a moving lens holding barrel and a guide shaft is long, an inclination angle of the moving lens holding barrel with respect to the guide shaft that arises due to a gap between the moving lens holding barrel and the guide shaft decreases, and hence image shake that occurs in driving the moving lens holding barrel can be suppressed.

Note that the lens barrel according to the present invention is not limited to the form of a so-called "interchangeable lens" that can be detachably attached to a camera as described in the above embodiment, and may be a form that is integrated with a camera or a video camera. Further, the lens barrel according to the present invention may be a lens barrel that holds a lens of an image pickup apparatus that is provided in binoculars, a sound recording device, a portable communication terminal, a game machine, a digital media player, a watch, a navigation apparatus and the like.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A lens barrel that holds a lens system comprising a plurality of lens groups, the lens barrel comprising:
   a cylindrical fixed barrel;
   an object-side fixed lens group that is a lens group that is positioned furthest on an object side of the lens system, and that is fixed to an object-side end portion of the fixed barrel;
   an image-side fixed lens group that is a lens group that is positioned furthest on an image side of the lens system, and that is fixed to an image-side end portion of the fixed barrel;
   a first focusing lens group that is a lens group that is arranged at a position that is further on the image side than the object-side fixed lens group of the lens system;
   a first moving lens holding barrel that holds the first focusing lens group and that is arranged so as to be movable along the optical axis inside the fixed barrel;
   a second focusing lens group that is a lens group that is arranged at a position that is further on the image side than the first focusing lens group of the lens system;
   a second moving lens holding barrel that holds the second focusing lens group and that is arranged so as to be movable along the optical axis inside the fixed barrel;
   a wobbling lens group that is a lens group comprising a single lens that is arranged at a position that is further on the image side than the second focusing lens group of the lens system;
   a third moving lens holding barrel that holds the wobbling lens group and that is arranged so as to be movable along the optical axis inside the fixed barrel;
   a first, second, and third drive mechanism portions that independently drive the first moving lens holding barrel, the second moving lens holding barrel, and the third moving lens holding barrel, respectively; and
   an exterior member that covers an outer circumference of the fixed barrel,
   wherein a wobbling operation is performed by causing the wobbling lens group to vibrate in the optical axis direction, and the lens barrel is configured to be capable of performing a focusing operation by moving the first focusing lens group and the second focusing lens group in an optical axis direction,
   the fixed barrel can be detached from the exterior member in a state in which the fixed barrel holds the lens system and the first, second, and third drive mechanism portions, and
   the first, second, and third drive mechanism portions can be assembled with respect to the fixed barrel from an outer circumferential portion of the fixed barrel in a state in which the fixed barrel holds the lens system,
   wherein the first drive mechanism portion is configured so as to engage with the first moving lens holding barrel through an opening portion that is provided in the outer circumferential portion of the fixed barrel, and the second and third drive mechanism portions are mounted inside of the fixed barrel and configured so as to engage with the second moving lens holding barrel and the third moving lens holding barrel, respectively.

2. The lens barrel according to claim 1, wherein:
   the first moving lens holding barrel, the second moving lens holding barrel, and the third moving lens holding barrel are each arranged so as to be guided and movable in the optical axis direction by a pair of cylindrical shaft-like guide shafts that are arranged along the optical axis inside the fixed barrel; and
   at least one of the first moving lens holding barrel, the second moving lens holding barrel, and the third moving lens holding barrel comprises a magnet on an outer circumferential portion and is urged in a predetermined radial direction of the guide shafts by a magnetic force between the magnet and a magnetic member comprising a material having magnetic properties that is fixed to the fixed barrel.

3. The lens barrel according to claim 2, wherein:
   each of the first, second, and third drive mechanism portions comprises a screw that is rotated around a rotational axis along the optical axis by an electric motor, and a nut that screws together with the screw and that moves forward and rearward along the rotational axis of the screw accompanying rotation of the screw, and is configured so as to drive the moving lens holding barrel by engagement of the nut with a nut engaging portion that is provided in the moving lens holding barrel; and
   in one or all of the first, second, and third drive mechanism portions, a rotational axis of the screw is arranged at a position at which a distance thereto from the optical axis is the same as a distance from the optical axis to the guide shafts that guide the moving lens holding barrels that the respective drive mechanism portions drive, or at a position that is nearer to the optical axis than the guide shafts.

4. The lens barrel according to claim 1, wherein the wobbling lens group comprises a single lens having a negative refractive power.

* * * * *